United States Patent

Houston et al.

[15] 3,639,273

[45] Feb. 1, 1972

[54] CATALYST COMPOSITION COMPRISING A MIXTURE

[72] Inventors: Robert J. Houston, San Rafael; Sigmund M. Csicsery, Lafayette, both of Calif.

[73] Assignee: Chevron Research Company, San Francisco, Calif.

[22] Filed: July 11, 1969

[21] Appl. No.: 840,916

[52] U.S. Cl. ......................................................252/455 R
[51] Int. Cl. ..............................................................B01j 11/40
[58] Field of Search..........................252/455; 208/138, 139

[56] References Cited

UNITED STATES PATENTS

| | | | |
|---|---|---|---|
| 3,535,231 | 10/1970 | Kittrell...............................252/455 R |
| 3,236,903 | 2/1966 | Milton..................................208/138 X |
| 3,252,757 | 5/1966 | Granquist.................................23/111 |
| 3,252,889 | 5/1966 | Capell et al............................208/120 |
| 3,376,215 | 4/1968 | Bertolacini et al....................208/138 |
| 3,415,737 | 12/1968 | Kluksdahl..............................208/139 |
| 3,499,836 | 3/1970 | Hayes et al............................208/138 |

Primary Examiner—Daniel E. Wyman
Assistant Examiner—C. F. Dees
Attorney—A. L. Snow, F. E. Johnston, C. J. Tonkin and Dix A. Newell

[57] ABSTRACT

A composition of matter useful particularly for reforming comprising a physical particle form mixture of (1) a layered crystalline clay type aluminosilicate and (2) a platinum group component in association with an alumina carrier or a silica carrier.

9 Claims, 2 Drawing Figures

INVENTORS
ROBERT J. HOUSTON
SIGMUND M. CSICSERY
ATTORNEYS

CATALYST COMPOSITION COMPRISING A MIXTURE

BACKGROUND OF THE INVENTION

Field

The present invention relates to a novel catalyst composition of matter. Particularly, the present invention relates to a novel catalyst composition useful for reforming reactions comprising a mixture of two components, one component being a layered crystalline clay-type aluminosilicate and the other component being a platinum group component in association with alumina or silica.

Prior Art

Catalytic reforming is well known in the petroleum industry and refers to the treatment of hydrocarbon feedstocks to improve the octane rating. In reforming, a number of reactions occur with each reaction being favored by a given set of conditions. The more important hydrocarbon reactions occurring during the reforming operations employing catalysts comprising dehydrogenation promoting metal components include dehydrogenation of naphthenes to aromatics, dehydrocyclization of normal paraffins to naphthenes and aromatics, isomerization of normal paraffins to isoparaffins, and hydrocracking of relatively long-chained paraffins. The predominant reactions in the first stages of reforming are dehydrogenation to convert $C_6$-ring naphthenes to aromatics and dehydroisomerization to convert alkylcyclopentanes, e.g., methylcyclopentane, to aromatics, major octane-improving conversions. The major reforming reactions which occur in the intermediate and later stages of reforming are dehydrocyclization of paraffins to aromatics and hydrocracking of high-molecular-weight hydrocarbons to lower molecular weight hydrocarbons.

Significant reforming of hydrocarbons can occur by using a single reactor system containing a reforming catalyst. However, to take advantage of the reaction sequence, it has become a general practice in catalytic reforming to employ in combination a plurality of fixed bed reactors, preferably adiabatic reactors, in series with provision for reheating hydrocarbon reactants between reactors. Generally the pressure employed in each reactor is decreased in the direction of hydrocarbon flow to avoid use of expensive compressors between reactor stages. The reactor inlet temperatures are dependent upon the feedstock, the composition, the feed hydrogen to hydrocarbon ratio, the reactant space velocity, type and distribution of catalyst among the several reactors, the degree of conversion desired, and the product selectivity desired from each reactor stage. In addition, in the usual reforming process an unequal distribution of catalyst is employed among the reactors.

In reforming it is important to obtain the highest yield of $C_5^+$ liquid product possible for the desired octane number. A decrease in $C_5^+$ product represents the production of light hydrocarbon gases which have little value compared to gasoline. Thus, it is important in reforming to adjust the conditions to obtain as high a possible yield of $C_5^+$ product and particularly as high a yield as possible of aromatics since aromatics represent the highest octane components of gasoline. Thus, for example, in the early stages of reforming, as in the first reaction zone, dehydrogenation of $C_6$-ring naphthenes and dehydroisomerization of alkylcyclopentane to aromatics should predominate with little or no cracking of the naphthenes and/or alkylcyclopentanes to $C_6$-paraffins or light gases.

For reforming, a catalyst composition comprising platinum on alumina is extensively used. However, the platinum containing catalyst is not necessarily the optimum catalyst for the several reactions occurring during reforming. Thus, efforts in obtaining catalyst compositions selective with various reactions in reforming are desirable.

SUMMARY OF THE INVENTION

A novel catalyst composition of matter has been discovered that is particularly useful in the reforming of hydrocarbons to produce high-octane gasolines. The novel catalyst composition has been found to possess excellent activity and selectivity for the conversion of $C_6$-ring naphthenes to aromatics, and alkylcyclopentanes, for example, methylcyclopentanes, to aromatics.

The novel catalyst composition comprises a physical particle form mixture of (1) a layered crystalline clay-type aluminosilicate and (2) a platinum group component in association with a porous amorphous solid carrier selected from the group consisting of silica and alumina.

BRIEF DESCRIPTION OF THE DRAWING

The present invention will be better understood and further explained hereinafter with reference to the graphs in FIGS. 1 and 2.

DESCRIPTION OF THE INVENTION

Figure 2:
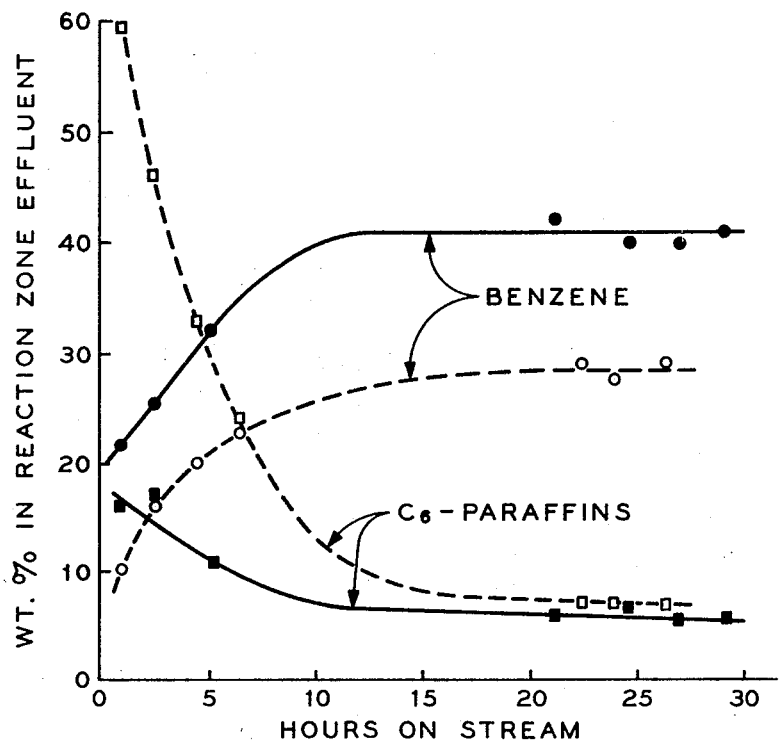
FIGS. 1 and 2 show, for comparison purposes, the results of reforming methylcyclopentane using a catalyst mixture comprising (1) a layered crystalline clay-type aluminosilicate and (2) platinum in association with alumina and the results of reforming methylcyclopentane with a catalyst comprising platinum in association with alumina, no layered crystalline clay-type aluminosilicate being present. The results are plotted as the weight percent of benzene and $C_6$-paraffins in the hydrocarbon product as a function of hours onstream.

The catalyst used in the present invention comprises a physical mixture of at least two major components: (1) a layered crystalline clay-type aluminosilicate and (2) a platinum group component in association with a porous amorphous solid carrier selected from the group consisting of alumina and silica. Preferably the weight ratios of the layered crystalline clay-type aluminosilicate to platinum group component-porous amorphous solid carrier are from 1:9 to 9:1. Preferably the layered crystalline clay-type aluminosilicate is present in the finished catalyst composition in an amount of from 10 weight percent to 70 weight percent, more preferably from 20 weight percent to 70 weight percent.

The layered crystalline clay-type aluminosilicate may be any catalytically active layered aluminosilicate, although the synthetic hydrated layered crystalline clay-type aluminosilicate of Granquist (U.S. Pat. No. 3,252,757) and the dehydrated form of Capell and Granquist (U.S. Pat. No. 3,252,889) are preferred. Said layered crystalline clay-type aluminoisilicates are referred to hereinafter for the sake of brevity as "layered aluminosilicate." The preferred hydrated layered aluminosilicate referred to in U.S. Pat. No. 3,252,757, incorporated herein by reference thereto, has the empirical formula

$nSiO_2 : Al_2O_3 : mAB : xH_2O,$ where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

The preferred dehydrated layered aluminosilicate referred to in U.S. Pat. No. 3,252,889, incorporated herein by reference thereto, has the empirical formula:

2.4 to $3.0SiO_2 : Al_2O_3 : 0.2$ to $0.6AB$ wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;

said crystalline material being further characterized by a $d_{001}$ spacing ranging from 9.6 to 10.2 A. units determined at 50 percent relative humidity and being predominantly ordered in two dimensions.

The dehydrated layered aluminosilicate of 3,252,889 is obtained from the hydrated layered aluminosilicate of U.S. Pat. No. 3,252,757 by calcination at a temperature within the range of 600° to 1,450° F., preferably 600° to 1,200° F. Upon calcination of the hydrated form, and removal of water, the $d_{001}$ spacing of the aluminosilicate collapses somewhat, resulting in a layered aluminosilicate of a smaller $d_{001}$ spacing. According to the teachings of U.S. Pat. No. 3,252,889, the collapse is irreversible and the dehydrated layered aluminosilicate is no longer capable of swelling—apparently the removal of water from the hydrated form results in a new and different chemical and indeed mineralogical species from the starting material.

The layered aluminosilicates are to be distinguished from the crystalline zeolitic molecular sieve components which have well ordered and uniform pore structures as a result of the crystalline structures having bonds that are substantially equally strong in three dimensions. Such crystalline zeolitic aluminosilicates as, for example, zeolite X referred to in U.S. Pat. No. 2,882,244 and zeolite Y referred to in U.S. Pat. No. 3,130,007, are found to be too acidic to be useful in reforming. Thus, the crystalline zeolitic molecular sieves result in excessive hydrocracking of the hydrocarbon naphtha feed components.

Generally when the layered aluminosilicate is in a sodium form, it is preferred for the process of the present invention that the sodium ions be replaced with other ions lower in the electromotive series than sodium. The sodium ion concentration on the layered aluminosilicate should preferably be less than about 1 weight percent. Thus, the layered aluminosilicate may contain, in place of the sodium, ions such as, e.g., calcium, magnesium, strontium, barium, rare earth metal ions, Groups IV through VIII metal ions, etc. It is particularly preferred that the layered aluminosilicate exists substantially in the ammonia or hydrogen form and that it be maintained substantially free of any catalytic loading metal or metals. When a sodium form of the layered aluminosilicate is one of the starting materials, it may be converted to the ammonia or hydrogen form by ion-exchange prior to being combined with the platinum group component-porous amorphous solid carrier. Alternately it may be combined with the other catalytic components, i.e., the platinum group component-porous amorphous solid carrier, and then converted to the ammonia or hydrogen form by ion-exchange.

The other component of the catalyst mixture used in the present invention comprises a platinum group component associated with a porous amorphous solid carrier selected from the group consisting of alumina and silica. The porous amorphous solid carrier should not contain any crystalline zeolitic or layered aluminosilicate material.

Alumina is a particularly preferred porous amorphous solid carrier. Any of the forms of alumina suitable for a support for a reforming catalyst can be used. Furthermore, alumina can be prepared by a variety of methods for purposes of this invention. Thus, the alumina can be prepared by adding a suitable alkaline agent such as ammonium hydroxide to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation aluminum hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination.

The other desired porous amorphous solid carrier is silica. A variety of methods are available for producing suitable silica supports. Silica can be produced by hydrolyzing tetraethyl orthosilicate with aqueous HCl solution. Likewise, silica can be prepared by contacting silicon tetrachloride with a cold methanol and water solution or with 95 percent ethyl alcohol, or with cold water or ice. Also silica can be prepared by contacting sodium silicate with an ion-exchange resin to remove the sodium or by contacting with an acid at a pH of about 2.5 or less.

The platinum group component which is associated with the porous amorphous solid carrier embraces all the members of Group VIII of the Periodic Table having an atomic weight greater than 100 as well as compounds and mixtures of any of these. Thus, the platinum group components comprise the Group VIII noble metals, e.g., platinum, palladium, iridium, ruthenium, rhodium and osmium. Platinum is the preferred component because of its better reforming activity. The platinum group component should be present in an amount of from 0.01 to 5 weight percent, preferably 0.01 to 3 weight percent. The weight percent of the platinum group component calculated as metal is based only on the platinum group component-porous amorphous solid carrier portion of the catalyst mixture. The greater the concentration of layered aluminosilicate in the finished catalyst, the more desirable to have a higher weight percent of platinum group component on the porous amorphous solid carrier. Thus, for example, when the layered aluminosilicate concentration is above 50 weight percent of the total catalyst, the platinum concentration on the porous amorphous solid carrier should be preferably greater than 1 weight percent.

Other components in addition to the platinum group component can be present with the porous amorphous solid carrier. It is particularly preferred that rhenium be present, for example, in an amount of from 0.01 to 5 weight percent and preferably 0.01 to 2 weight percent, based on the porous amorphous solid carrier portion of the mixture. Regardless of the form in which rhenium exists on the catalyst, whether as metal or compound, the weight percent is calculated as the metal. Rhenium significantly improves the yield stability of the catalyst; that is, a process using a catalyst comprising platinum and rhenium in association with a porous amorphous solid carrier has a significantly lower yield decline throughout the reforming process than a catalyst comprising platinum without rhenium. Platinum-rhenium catalyst is more fully described in U.S. Pat. No. 3,415,737.

The portion of the catalyst mixture comprising the platinum group component in association with the porous amorphous solid carrier can be prepared by a variety of methods; that is, the platinum group component can be associated with the porous solid carrier by impregnation, ion-exchange, coprecipitation, etc. Generally, it is preferred to incorporate the platinum group component by impregnation. When rhenium is incorporated along with the platinum group component, the rhenium component can also be associated with the carrier by various techniques, e.g., impregnation, ion-exchange, coprecipitation, etc. Preferably, the platinum group component and rhenium component are associated with the carrier by impregnation, either simultaneously or sequentially. Particularly preferred platinum group components for use in impregnation include chloroplatinic acid, ammonium chloroplatinates, polyammineplatinum salts, palladium chloride, etc. Suitable rhenium compounds are perrhenic acid, ammonium or potassium perrhenates, etc.

The catalyst mixture of the present invention consists of a physical particle form mixture of the aluminosilicate and the platinum group component-porous amorphous solid carrier (alumina and silica). A physical particle-form catalyst mixture can be prepared by mixing the layered aluminosilicate and the platinum group component-porous amorphous solid carrier in the form of discrete particles or the components can be admixed, pelleted, cast, molded or otherwise formed into pieces of desired size and shape such as rods, spheres, pellets or other configuration. The particle size of the individual components of the physical mixture may be very small, e.g., less than about 50 microns. Alternately, the particles may be sufficiently large and distinct as to permit ready separation thereof by mechanical means which in turn makes possible separate regeneration, reactivation, and replacement of the two components. Accordingly, the particle size of the two components making up the particle-form physical mixture may fall within the approximate range of 2 to 50 mesh (Tyler).

The catalyst can be promoted for reforming by the addition of halides, particularly fluorides or chlorides. Bromides may also be used. The halides provide a limited amount of acidity to the catalyst which is beneficial to most reforming operations. The catalyst mixture can be promoted with from 0.1 to 3 weight percent total halide. Halides can be incorporated onto the catalyst at any particularly suitable stage of catalyst manufacture; for example, the halides can be incorporated onto the porous amorphous solid carrier prior to or following admixture with the layered aluminosilicate. Also, the halide can be incorporated onto the catalyst carrier prior to or following incorporation of the platinum group component with the porous amorphous solid carrier. Halide can also be incorporated onto the catalyst during incorporation of the platinum group component or rhenium component; thus, impregnation of the porous amorphous solid carrier with chloroplatinic acid normally results in halide addition to the catalyst.

The physical particle-form mixture of (1) a layered aluminosilicate and (2) a platinum group component in association with alumina and silica can exist in the calcined or uncalcined form. Desirably, the catalyst is calcined at an elevated temperature in the presence of an oxidizing atmosphere, e.g., air. Calcination temperatures can vary from preferably above 500° F. and generally from 700° to 1,000° F. Higher temperatures may also be used. Excessive temperatures, i.e., above 1,300° F., should not be used during calcination inasmuch as the crystallinity of the layered aluminosilicate may be destroyed. It is particularly desired that when the physical mixture comprises a hydrated aluminosilicate of the Granquist type (U.S. Pat. No. 3,252,757) that the mixture be calcined prior to use in a hydroconversion reaction such as reforming. The calcination can normally convert the hydrated layered aluminosilicate. When the starting materials for the physical particle-form mixture comprises a layered aluminosilicate of the dehydrated form as disclosed in Capell and Granquist (U.S. Pat. No. 3,252,889), it may not be necessary to calcine. However, the general rule is that calcination is performed prior to use of the catalyst mixture in a hydroconversion reaction.

It is often helpful to sulfide the physical mixture prior to reforming. The sulfiding may be accomplished by passing $H_2S$ or an organic sulfur compound, e.g., dimethyldisulfide, which converts to $H_2S$ in the presence of hydrogen, in contact with the catalyst along with hydrogen. Generally, the sulfiding is preceded by contacting the physical mixture in the presence of hydrogen for at least 0.1 hour and preferably at least 0.5 hour. Following sulfiding of the catalyst, hydrogen is usually continued in contact with the catalyst for a period of time of at least 0.1 hour. The sulfiding has been found to help improve the selectivity of the catalyst for the conversion of alkylcyclopentanes to aromatics. Thus, ring opening of the alkylcyclopentanes, which results in the formation of paraffins, is hindered by sulfiding the catalyst prior to reforming. Sulfiding of the catalyst can be accomplished in situ just prior to the introduction of naphtha in contact with the catalyst. The sulfiding can also occur during the period of time that naphtha is being introduced into contact with the catalyst.

The catalyst of the present invention is advantageously utilized to reform naphtha boiling range feedstocks of varied hydrocarbon compositions. Thus, the novel catalytic physical mixture is advantageously employed in reforming a feedstock boiling within the range of from 70° to 550° F. and preferably from 150° to 450° F., said feed being at reforming conditions including a temperature of between 600° to 1,100° F., preferably 700° to 1,050° F., and a pressure from atmospheric to superatmospheric, preferably from 25 to 1,000 p.s.i.g. and more preferably from 50 to 750 p.s.i.g. The reforming reaction conditions will, in general, depend in large measure on the feeds used and upon the desired octane rating of the product. Temperature and pressure can be correlated with the liquid hourly space velocity (LHSV) to favor any particularly desirable reforming reaction as, for example, aromatization, isomerization or dehydrogenation. In general the liquid hourly space velocity will be from 0.1 to 10 and preferably from 1 to 5. The molar ratio of hydrogen to hydrocarbon will vary from 0.5 to 20 and preferably from 1 to 10. The hydrogen may be bottled hydrogen or may be recycle hydrogen, i.e., hydrogen recovered from the effluent of the reaction zone, purified and returned to the inlet of the reaction zone.

The catalyst in the present invention is particularly useful for reforming feeds containing significant amounts of naphthenes, e.g., alkylcyclopentanes. Thus the novel catalyst is particularly useful in reforming feeds containing more than 10 volume percent naphthenes (such as alkylcyclopentanes, e.g., methylcyclopentanes) at reaction conditions including a temperature of from 750° to 900° F. and a pressure of less than about 400 p.s.i.g. The lower pressure and temperature are more favorable for the conversion of $C_5$-ring naphthenes to aromatics. The present invention may be better understood by reference to the following examples.

EXAMPLE 1

A catalyst comprising 50 weight percent synthetic layered crystalline clay-type aluminosilicate, as described in U.S. Pat. No. 3,252,757, and 50 weight percent of a platinum-alumina composite was prepared by physically mixing the two components. The layered aluminosilicate existed substantially as the hydrogen form. The platinum-alumina component contained 1.2 weight percent platinum and was prepared by impregnating alumina with chloroplatinic acid in sufficient concentration to provide the desired amount of platinum on the alumina.

For comparison purposes, a catalyst comprising 1.2 weight percent platinum on alumina was prepared by impregnating alumina with chloroplatinic acid.

Both catalysts were tested for the reforming of methylcyclopentane to aromatics, i.e., benzene. The reaction conditions in both cases included a temperature of 850° F., a pressure of 160 p.s.i.g., a hydrogen to hydrocarbon mole ratio of 3.5 and a liquid hourly space velocity of 8, based on platinum-alumina component. Five hundred p.p.m. water was added to the feed as 1-hexanol in both cases to rapidly equilibrate the catalysts for methylcyclopentane conversion. Thus, shorter onstream times were necessary in order to determine the effectiveness of the catalysts for methylcyclopentane conversion. The amount of platinum-alumina catalyst used for the comparison test was the same as that used in the physical mixture.

Figure 1:
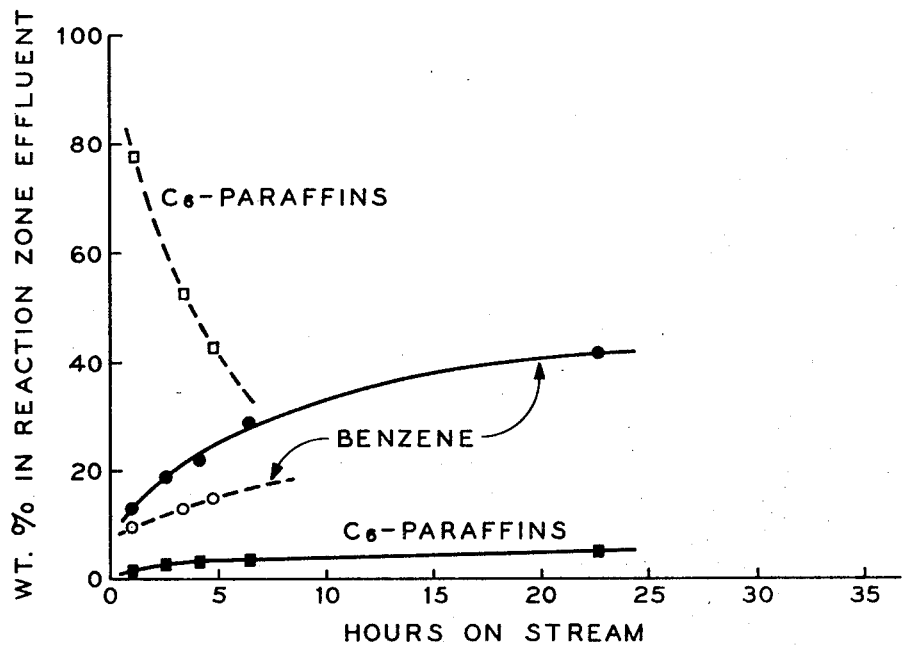

The results of reforming methylcyclopentane to benzene are shown in FIG. 1. FIG. 1 is a graph of the weight percent of the respective components in the effluent from the reaction zone as a function of the hours onstream. The solid lines are for the process using the catalyst mixture. The dashed lines are for the process using only the platinum-alumina catalyst. The high selectivity of the catalyst mixture for converting methylcyclopentane to benzene is shown by the high yield of benzene produced; the yield is significantly higher than the yield of benzene produced using the platinum-alumina catalyst without a layered aluminosilicate in association therewith.

Thus, the undesirable cracking reaction or ring opening reaction is substantially eliminated using the catalyst comprising a layered aluminosilicate in admixture with a platinum-alumina component. A platinum-alumina catalyst by itself results in significant ring opening particularly during the early stages of reforming as seen in FIG. 1.

EXAMPLE 2

A catalyst comprising a physical mixture of (1) a layered crystalline clay-type aluminosilicate as described in U.S. Pat. No. 3,252,757 and (2) platinum and rhenium on alumina was prepared. The physical mixture comprised 25 weight percent of the layered aluminosilicate described in U.S. Pat. No. 3,252,757, 25 weight percent kaolinite, and 50 weight percent of the platinum-rhenium-alumina component. The layered aluminosilicate existed substantially in the hydrogen form. The platinum-rhenium-alumina component contained 1.2 weight percent platinum and 0.3 weight percent rhenium. It was prepared by impregnating alumina with chloroplatinic acid and perrhenic acid in sufficient concentration to provide the desired amount of platinum and rhenium on alumina. As a result of the impregnation, approximately 1.2 weight percent chloride was introduced to the platinum-rhenium-alumina component. The physical mixture was pelleted, crushed and screened to 28–60 mesh and finally calcined in air for two hours at 700° F.

For comparison purposes a catalyst comprising 0.6 weight percent platinum and 0.6 weight percent rhenium associated with alumina was prepared by impregnating alumina with chloroplatinic acid and perrhenic acid. The catalyst also contained approximately 0.6 weight percent chloride. The catalyst was crushed and screened to 28–60 mesh and calcined in air for 2 hours at 700° F.

The catalysts were tested for the reforming of methylcyclopentane to aromatics, i.e., benzene, at reaction conditions including a temperature of 850° F., a pressure of 160 p.s.i.g., a hydrogen to hydrocarbon mole ratio of 3.5 and a liquid hourly space velocity of 4. 1-hexanol in an amount equivalent to 50 p.p.m. water was added to the feed in both cases. The volume of catalyst in both tests was the same.

The results of reforming methylcyclopentane to benzene are shown in FIG. 2 which is a graph of the weight percent of the respective components in the effluent from the reaction zone as a function of the hours onstream. The solid lines are for the process using the catalyst mixture of (1) layered aluminosilicate and (2) platinum-rhenium-alumina. The dashed lines are for the process using the platinum-rhenium-alumina catalyst. It is noted that the selectivity of the catalyst mixture for converting methylcyclopentane to benzene is very high; thus, the yield of benzene produced is significantly higher than the yield of benzene produced using the platinum-rhenium-alumina catalyst, no layered aluminosilicate being present. It is also observed that the platinum-rhenium-alumina catalyst by itself results in significant ring opening, particularly during the early stages of reforming. On the other hand, the catalyst mixture does not exhibit substantial undesirable cracking or ring-opening reactions.

The foregoing disclosure of this invention is not to be considered as limiting since many variations can be made by those skilled in the art without departing from the scope or spirit of the appended claims.

We claim:

1. A composition of matter which comprises a physical mixture of (1) a layered crystalline clay-type aluminosilicate and (2) a platinum group component in association with a porous amorphous solid carrier of alumina or silica.

2. The composition of matter of claim 1 wherein said layered crystalline clay-type aluminosilicate contains less than about 1 weight percent sodium.

3. The composition of matter of claim 1 wherein said layered crystalline clay-type aluminosilicate is substantially in the ammonia or hydrogen form.

4. The composition of matter of claim 1 wherein said platinum group component is platinum.

5. The composition of matter of claim 1 wherein the amount of platinum group component in association with the carrier is from 0.01 to 5 weight percent.

6. The composition of matter of claim 1 wherein rhenium is present with the platinum group component carrier in an amount of from 0.01 to 5 weight percent.

7. A composition of matter which comprises a physical mixture of discrete particle forms of (1) a layered crystalline clay-type aluminosilicate substantially in the hydrogen or ammonia form in an amount of from 10 to 70 weight percent based on the total composition and (2) platinum in association with a porous amorphous solid carrier selected from the group consisting of alumina and silica, the amount of platinum present with the porous amorphous solid carrier being from 0.01 to 5 weight percent.

8. A composition of matter comprising a physical particle form mixture of (1) a layered crystalline clay-type alumino-silicate having the empirical formula:

$$nSiO_2:Al_2O_3:mAB;xH_2O$$

where the layer lattices comprise said silica, said alumina, and said B, and where $n$ is from 2.4 to 3.0, $m$ is from 0.2 to 0.6, A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 when A is divalent, and to a value intermediate between 12.0 A. and 14.7 A. when A includes both monovalent and divalent cations, and (2) platinum in association with alumina, the amount of platinum present with the alumina being from 0.01 to 5 weight percent.

9. A composition of matter comprising a physical particle form mixture of (1) a layered crystalline clay-type aluminosilicate having the empirical formula:

2.4 to 3.0 $SiO_2:Al_2O_3:0.2$ to $0.6AB$ wherein the layer lattices comprise silica ($SiO_2$), alumina ($Al_2O_3$) and B; and wherein A is one equivalent of an exchangeable cation selected from the group consisting of hydrogen, alkali metal, and alkaline earth metal ions, and mixtures thereof; and wherein B is one equivalent of an anion selected from the group consisting of fluoride, hydroxyl, and oxygen ions, and mixtures thereof;

said crystalline material being further characterized by a $d_{001}$ spacing ranging from 9.6 to 10.2 A. units determined at 50 percent relative humidity and being predominantly ordered in two dimensions, and (2) platinum in association with alumina, the amount of platinum present with the alumina being from 0.01 to 5 weight percent.

* * * * *